(12) United States Patent
Weber et al.

(10) Patent No.: US 9,996,538 B2
(45) Date of Patent: *Jun. 12, 2018

(54) EFFECTS APPLICATION BASED ON OBJECT CLUSTERING

(71) Applicant: Apple Inc., Cupertino, CA (US)

(72) Inventors: Ralf Weber, Cupertino, CA (US); Bob Van Osten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/713,996

(22) Filed: May 15, 2015

(65) Prior Publication Data

US 2015/0370804 A1 Dec. 24, 2015

Related U.S. Application Data

(63) Continuation of application No. 13/919,610, filed on Jun. 17, 2013, now Pat. No. 9,047,255, which is a continuation of application No. 12/499,672, filed on Jul. 8, 2009, now Pat. No. 8,495,074.

(60) Provisional application No. 61/193,853, filed on Dec. 30, 2008.

(51) Int. Cl.
| | |
|---|---|
| *G06F 17/30* | (2006.01) |
| *G06F 17/21* | (2006.01) |
| *G11B 27/034* | (2006.01) |
| *G11B 27/038* | (2006.01) |
| *G11B 27/28* | (2006.01) |
| *G11B 27/34* | (2006.01) |

(52) U.S. Cl.
CPC ...... *G06F 17/30058* (2013.01); *G06F 17/212* (2013.01); *G06F 17/30056* (2013.01); *G06F 17/30572* (2013.01); *G06F 17/30601* (2013.01); *G11B 27/034* (2013.01); *G11B 27/038* (2013.01); *G11B 27/28* (2013.01); *G11B 27/34* (2013.01)

(58) Field of Classification Search
CPC ......... G06F 17/30817; G06F 17/30837; G06F 17/3084; G06F 17/30843; G06F 17/30849; G06F 17/30011; G06F 17/30017; G06F 17/3005; G06F 17/30056
USPC .......................... 707/755, 771; 715/744–747
See application file for complete search history.

(56) References Cited

U.S. PATENT DOCUMENTS

| | | | |
|---|---|---|---|
| 6,683,649 B1 | 1/2004 | Anderson | |
| 6,738,075 B1 | 5/2004 | Torres et al. | |
| 6,744,974 B2 | 6/2004 | Neuman | |
| 6,807,575 B1 * | 10/2004 | Emaru | G06F 11/3419 709/203 |
| 7,131,059 B2 * | 10/2006 | Obrador | G06F 17/30056 715/209 |
| 7,149,755 B2 | 12/2006 | Obrador | |
| 7,426,734 B2 | 9/2008 | Debique et al. | |

(Continued)

*Primary Examiner* — Hanh B Thai
(74) *Attorney, Agent, or Firm* — Dickinson Wright RLLP

(57) ABSTRACT

A system in accordance with the present invention may include one or more processors, memory that receives instructions from the one or more processors according to a clock operating at a frequency, one or more programs stored in the memory, with instructions to: access media content; analyze the media content according to meta data, media characteristics, or other media-related data; and, create a media content object cluster according to the meta data, the media characteristics, or the other media-related data.

20 Claims, 14 Drawing Sheets

(56) References Cited

U.S. PATENT DOCUMENTS

| | | |
|---|---|---|
| 7,475,337 B1 | 1/2009 | Huang |
| 7,664,882 B2 | 2/2010 | Mohammed et al. |
| 8,495,074 B2 | 7/2013 | Weber et al. |
| 9,002,177 B2* | 4/2015 | Greenberg ............. G06Q 10/06 386/278 |
| 9,047,255 B2 | 6/2015 | Weber et al. |
| 9,251,296 B2* | 2/2016 | Haub ................ G06F 17/30997 |
| 2003/0074368 A1 | 4/2003 | Schuetze et al. |
| 2003/0078840 A1 | 4/2003 | Strunk et al. |
| 2003/0110181 A1 | 6/2003 | Schuetze et al. |
| 2003/0110503 A1* | 6/2003 | Perkes ............... H04N 7/17318 725/86 |
| 2003/0233460 A1 | 12/2003 | Drucker et al. |
| 2004/0019608 A1* | 1/2004 | Obrador ............ G06F 17/30044 |
| 2004/0143590 A1 | 6/2004 | Wong et al. |
| 2004/0143604 A1 | 7/2004 | Glenner et al. |
| 2004/0218894 A1 | 11/2004 | Harville et al. |
| 2004/0267816 A1 | 12/2004 | Russek |
| 2005/0027712 A1 | 2/2005 | Gargi |
| 2005/0131932 A1* | 6/2005 | Weare ............... G06F 17/30699 |
| 2005/0149473 A1* | 7/2005 | Weare .................... G06Q 10/10 |
| 2005/0182773 A1 | 8/2005 | Feinsmith |
| 2005/0268279 A1* | 12/2005 | Paulsen ..................... G06F 8/38 717/110 |
| 2006/0026524 A1* | 2/2006 | Ma .................... G06F 17/30793 715/713 |
| 2006/0092295 A1* | 5/2006 | Mercer ................ G11B 27/031 348/239 |
| 2006/0161867 A1 | 7/2006 | Drucker et al. |
| 2006/0242126 A1* | 10/2006 | Fitzhugh ........... G06F 17/30058 |
| 2006/0271526 A1 | 11/2006 | Charnock et al. |
| 2007/0078886 A1 | 4/2007 | Rivette et al. |
| 2007/0083818 A1 | 4/2007 | Drucker et al. |
| 2007/0094251 A1* | 4/2007 | Lu .................... G06F 17/30056 |
| 2007/0130177 A1 | 6/2007 | Schneider et al. |
| 2007/0150496 A1 | 6/2007 | Feinsmith |
| 2007/0201086 A1 | 8/2007 | Kim et al. |
| 2007/0244694 A1 | 10/2007 | Hosokawa |
| 2007/0244874 A1* | 10/2007 | Tawde ................ G06F 17/3071 |
| 2008/0005652 A1 | 1/2008 | Krishnaswamy et al. |
| 2008/0098032 A1 | 4/2008 | Wu |
| 2008/0115066 A1 | 5/2008 | Pavley et al. |
| 2008/0201118 A1 | 8/2008 | Luo |
| 2008/0262998 A1 | 10/2008 | Signorini et al. |
| 2009/0012959 A1 | 1/2009 | Ylivainio et al. |
| 2009/0043797 A1 | 2/2009 | Dorie et al. |
| 2009/0100357 A1 | 4/2009 | Signorini et al. |
| 2009/0119332 A1 | 5/2009 | Lection |
| 2009/0119392 A1 | 5/2009 | Bonjour et al. |
| 2009/0119578 A1 | 5/2009 | Relyea et al. |
| 2009/0119614 A1 | 5/2009 | Tienvieri et al. |
| 2009/0158214 A1 | 6/2009 | Arnold et al. |
| 2009/0254515 A1* | 10/2009 | Terheggen .......... G06F 17/3002 |
| 2009/0254643 A1* | 10/2009 | Terheggen .......... G06F 17/3005 709/223 |
| 2009/0319472 A1* | 12/2009 | Jain ..................... G06F 17/3025 |
| 2009/0327331 A1 | 12/2009 | Mathew et al. |
| 2010/0063970 A1 | 3/2010 | Kim |
| 2010/0067882 A1 | 3/2010 | Axen et al. |

* cited by examiner

EFFECTS APPLICATION BASED ON OBJECT CLUSTERING

CROSS-REFERENCE TO RELATED APPLICATIONS

This application is a continuation of U.S. patent application Ser. No. 13/919,610, filed Jun. 17, 2013, now U.S. Pat. No. 9,047,255, entitled "Effects Application Based on Object Clustering, which is a continuation of U.S. patent application Ser. No. 12/499,672, filed Jul. 8, 2009, now U.S. Pat. No. 8,495,074, entitled "Effects Application Based on Object Clustering" and claims the benefit of the U.S. Provisional Patent Application No. 61/193,853 filed on Dec. 30, 2008, each of which are hereby incorporated by reference herein.

BACKGROUND OF THE INVENTION

Field of Invention

The present invention relates generally to the field of media presentations and, in particular, to authoring, rendering, viewing, exporting, and sharing media effects.

Background of Invention

Current media presentation applications offer features for creating slides and manually customizing the ways in which a set of slides, i.e., a slideshow/media presentation, is played. Such applications also offer features for attaching themes to slideshows, where such themes may affect the appearance and general behavior of the slideshows when played. In addition, such applications further offer features such as customizing slide colors, customizing transition behavior, customizing transition delay, and manually adding clip art/image/audio/video files to one or more slides in a slideshow. These applications also permit basic sequential transition, forward or backward, and from one slide to another in a slideshow containing more than one slide. A user may customize the time that one slide should be viewed prior to the application invoking a transition to another slide, which may further have a custom viewing time associated with it as well. However, current media presentations applications do not provide a feature for authoring media effects, comprising: accessing media content; analyzing the media content according to meta data, media characteristics, or other media-related data; and creating a media content object cluster according to the meta data, the media characteristics, or the other media-related data. Moreover, current media presentation applications also do not provide a feature for dynamically profiling a slideshow soundtrack based on various criteria like beats per minute (BPM), rhythmic strength (RS), harmonic complexity (HC), and/or root mean square density (RMS or RMS strength). Such criteria, when profiled intelligently, may be further used to select appropriate effects and assemble such effects in useful ways applicable to a slideshow. Further, such effects could be customized according to durations, in/out points, and transitions in-sync with audio alone or the audio of a video. Finally, current media presentation applications do not provide features for automatic, as well as user-defined, authoring, rendering, exporting, and sharing media presentations/slideshows in an easily integrated modern platform.

SUMMARY OF THE INVENTION

Accordingly, the present invention is directed to a system and method for authoring, rendering, exporting, and sharing media effects that substantially obviates one or more problems due to limitations and disadvantages of the related art.

An embodiment of the present invention provides a computer-implemented method for authoring media effects, comprising: accessing media content; analyzing the media content according to meta data, media characteristics, or other media-related data; and, creating a media content object cluster according to the meta data, the media characteristics, or the other media-related data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system comprises one or more processors; memory; one or more programs stored in memory, the one or more programs comprising instructions to: access media content; analyze the media content according to meta data, media characteristics, or other media-related data; and, create a media content object cluster according to the meta data, the media characteristics, or the other media-related data.

In another aspect, a computer-readable storage medium stores one or more programs configured for execution by a computer, the one or more programs comprising instructions to: access media content; analyze the media content according to meta data, media characteristics, or other media-related data; and, create a media content object cluster according to the meta data, the media characteristics, or the other media-related data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
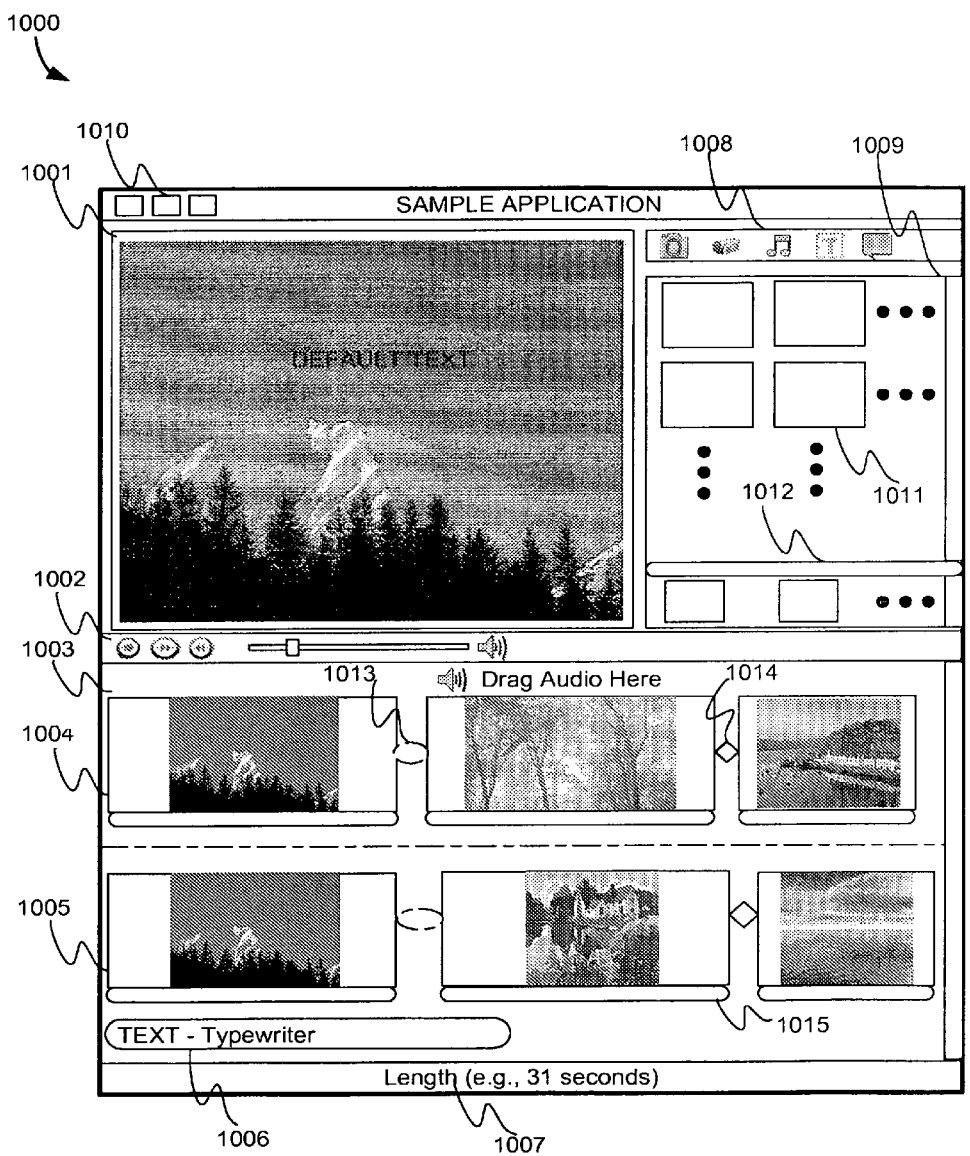
FIG. 1 illustrates an exemplary embodiment of an application in accordance with the present invention.

FIG. 1 illustrates an exemplary embodiment of an application in accordance with the present invention. The exemplary embodiment of an application 1000 comprises a document 1001, a set of controls 1002 for controlling/manipulating the document 1001, an edit layers and effect containers region 1003 (e.g., steps 6001, 7001), a background layer 1004 with effect containers and effects associated with the effect containers, a foreground layer 1005 with effect containers and effects associated with the effect containers, a text typewriter 1006 for associating text with one or more effect containers/effects/slides, a document length 1007 indicator, a select media content menu 1008 (e.g., steps 6002, 7002), a main effects library 1009, a documents selection menu 1010 for selecting among available documents, one or more effects 1011 (which may be available according to a filter criteria) within the main effects library 1009, a subset of the main effects library 1012, a gap variable 1013 for separating an effect or effect container (with one or more effects and slides) from the next effect or effect container using a gap, a transition variable 1014 for separating an effect or effect container (with one or more effects and slides) from the next effect or effect container using a transition, and an effect style 1015 (also, name or property). The exemplary embodiment of an application 1000 illustrates a use of the application 1000 to create a document 1001 (e.g., steps 6004, 7004; step 9009) using a background layer 1004, a foreground layer 1005 (additional background/foreground layers may also be added to the document but may not be illustrated in FIG. 1) (e.g., steps 7008, 7009; step 9009), customized gaps 1013 and/or transitions 1014 separating effect containers. Effect containers may comprise, for example, one or more effects from, for example, the main effects library 1009 or the subset of the main effects library 1012; and, effects may further comprise one or more slides like, for example, images, movies, audio, text (e.g., a string with font information that may determine how text will look and feel), and other media content (e.g., steps 6002, 7002, 7006, 7012, 7013; step 9012). Effects may determine how the image and its surroundings will appear on a screen/display during play (e.g., an image may be displayed according to "book theme," where the effect would be the feature/component for determining how the photos may be laid out or organized on-screen; an effect may store/pass information related to how a photo would bounce around on a screen; or, an effect may also store/pass information related to text, where the text may be added or associated with a slide, effect, layer, or document of a slideshow/media presentation). Further, effects may be filtered according to media content type using the select media content menu 1008. For example, images, video, audio, text, and captions may be used to filter effects accordingly. Meaning, the relevant effects associated with each of the foregoing types of media content may be displayed accordingly upon invocation of the respective menu item from the select media content menu 1008. Details regarding effects may be displayed in the effects style 1015 section, which may be positioned beneath each respective effect container, and corresponding to a presently active effect, in the effect containers region 1003.

In some embodiments, the exemplary embodiment of an application 1000, and its features/components, may be implemented by one or more modules/engines (FIG. 3A, reference numerals 3020-23) executed using an exemplary system 4000 (FIG. 4) with a central processing unit (CPU) 4001 (and, alternatively, multiple CPUs), memory 4002 for storing data (e.g., instructions from an operating system 4007 or one or more programs (e.g., 4008, 4009)) to be fetched by the CPU for execution, a display device 4003 for displaying the exemplary application 1000 using a graphics module to a display screen, a network interface card (NIC) 4004 for sending and receiving data over a wired or wireless communications network, local storage 4006 for storing media content and other data (e.g., an operating system 4007, the exemplary embodiment of an application 1000, other applications, etc.), and auxiliary device(s)/component(s) 4005 (e.g., TV (or, other display), portable storage, portable media player, etc.), which may all be connected via a bus for sending and receiving data according to a frequency (e.g., synchronous or asynchronous).

In some embodiments, the features/components of the application 1000 may be described as follows. The document 1001 (also, FIG. 3, reference numeral 3001) is the top level object of the media presentation/slideshow that may be created (e.g., steps 6004, 7004) using the exemplary application 1000. The document is the object that may comprise: all of the custom/default layers 1004, 1005 (also, FIG. 3, reference numeral 3002) (e.g., steps 6003, 7003, 7010), effect containers such as, for example, those within the effect containers region 1003 (also, FIG. 3, reference numeral 3003); effects such as, for example, those within the effect containers (also, FIG. 3, reference numeral 3004); gaps 1013 or transitions 1014 for separating or linking effects, respectively (also, FIG. 3, reference numeral 3012); slides such as, for example, the images of FIG. 1 or other media content as described above (also, FIG. 3, reference numeral 3005, 3010) (e.g., step 6002, 7002); frames 3006; a document/layer/effect stack 3007; a layer/effect/slide/filter stack 3011; a playlist 3008; an animation path 3014; a song 3009; a keyframe 3015 (which may, for example, be one dimensional (1D) 3016, two dimensional (2D) 3017 or a vector (3018)); filters 3019; a layer/effect container/effect/slide/filter stack 3013; and, any other possible combination of the aforementioned. Moreover, a document may contain layers that may be stacked/placed one on top of another to provide the media presentation/slideshow with an added level of flexibility in what is available for actual display (e.g., steps 6003, 7003, 7010). Accordingly, the application supports the presentation of less than all of the available layers. Stacking may involve a process, for example, of logically associating, or linking, layers. That is, a background layer 1004 may be considered the lowest level layer in a stack of layers, followed by a foreground layer 1005 and a plurality of other foreground layers, all of which would be logically associated according to their position from, for example, background layer 1004, or from each other foreground layer. During display/play of a document such as, for example, document 1001, the layers would be displayed/played according to their respective positions in the stack (logical associations). The next feature/component is the layers 1004 (background), 1005 (foreground) (also, FIG. 3, reference numeral 3002) within a document 1001 (also, FIG. 3, reference numeral 3001) (e.g., steps 6001, 7001). Each layer 1004, 1005 of a stack of layers (e.g., aggregated layers; steps 6003, 7003) within a document can be positioned, sized, and rotated using the exemplary application 1000. Further, each layer 1004, 1005 may also have a custom audio file/track (or, alternatively, a set of audio files/tracks, or other media content) associated with it and other layers 1004, 1005, thus, providing a media presentation/slideshow with multiple audio files/tracks during presentation (e.g., steps 6002, 7002). Each layer 1004, 1005 may also contain effect containers (like, for example, those illustrated in the effect containers region 1003) (e.g., steps 6002, 7002), which may be linked together in a layer using transitions 1014 (also, FIG. 3, reference numeral 3012) or separated from one another using gaps 1013 (or, alternatively, some other effect separation variable like, for example, random separation/transition, or a combination of gaps and transitions, etc.) (e.g., 7005). Transitions 1014, which through visual action/expression may create the appearance that two effect containers are linked together, may be able to provide a rather "fluid" (or, alternatively, a "non-fluid") experience between effect containers when presenting a media presentation/slideshow. For example, transitions may be the visual action/expression of a page flipping, a slide dissolving, a slide being pushed along in any direction, a cube breaking apart (or, being assembled), a page rolling for the purpose of unveiling/hiding contents, a puzzle being assembled (or, disassembled), or any other type of visual action/expression applied to an effect container or slide and capable of being rendered on a display device. Slides in the exemplary application may be the actual image, movie, text, or other media content that may be within an effect, which may be within an effect container (e.g., steps 6002, 7002). Slides may have frames applied as an added layer (e.g., on top), where a frame may be a visual element/expression such as, for example, making an image appear as if it was taken using an instant photo camera (e.g., Polaroid®), is part of a filmstrip, has a solid/dashed/shadowed/other border surrounding it, or other type of frame-related visual element/expression. Further, each slide may have an animation path 3014 that may determine which part of a slide image, movie, text, or other media content, is actually displayed/played; similarly, an animation path 3014 associated with the slide may cause a panning/zooming effect to be executed on the image, movie, text, or other media content, where the panning/zooming may occur within the effect of the slide. As applied to a layer, a user may also customize an animation path 3014 via the exemplary application 1000 to, for example, smoothly transition a layer's rotation from around zero (0) degrees all the way to three hundred sixty (360) degrees, over a default or custom period of time (e.g., steps 6002, 7002). In some embodiments, transitions 1014 may have durations associated with them to determine how long the transitions are played. The transition duration may be subtracted directly from the total duration of the effect containers separated/divided by the transition. For example, when transitioning from an effect container with a three (3) second duration to another effect container with a three (3) second duration, that is, having a six (6) second total duration, using a transition with a one (1) second duration, the effect containers may only be played for a total of five (5) seconds (i.e., the total six (6) second duration of the effect containers minus the one (1) second transition display/play duration leaves five (5) seconds of display/play duration for the effect containers).

In some embodiments, effect containers may be able to determine the order that images (or, alternatively, other media content) associated with a layer (e.g., steps 6002, 7002) are presented during a media presentation/slideshow. Such a determination may be based according to characteristics associated with the images (or, alternatively, other media content) (e.g., steps 6004, 7004). The characteristics may comprise a resolution, size, quality indicator, dots-per-inch, frames per second, window size, bit error rate (BER), compression type, or some other media content characteristic. The exemplary application 1000 may execute this process of assembling the layers (e.g., steps 6004, 7004) either manually or according to algorithms processing the characteristics and other layer-related data (described above). Further with respect to effect containers (e.g., a container or group of effects), multiple effects may be transitioned as one set into the next effect container. For example, effect containers are necessary in order for different text to be displayed on top of different effects. In some embodiments, from an implementation viewpoint, the effect containers permit the logical/physical grouping of different effects and link each of the effects to their respective different text, which is to be displayed on top of each respective effect. Each effect container may, for example, further contain a variable for storing a specific duration for determining how long each of the effects associated with an effect container (or, alternatively, "within" the effect container) are displayed/played.

In some embodiments, a keyframe 3015 (which may, for example, be one dimensional (1D) 3016, two dimensional (2D) 3017 or a vector (3018)), may be used by an animation path 3014 to guide or instruct the rate at which animation path 3014 should operate. Meaning, the higher the value of a keyframe 3015, the increased rate the animation path 3014 may operate (e.g., a faster pan-zoom effect or a faster layer rotation), and the lower the value of a keyframe 3015, the lower rate the animation path 3014 may operate at (e.g., a slower pan-zoom effect or a slower layer rotation). A 1D 3016 keyframe may be a keyframe that animates a property that has one value like, for example, a rotation angle. A 2D 3017 keyframe may be a keyframe that animates a property that has more than one value like, for example, a position (x-axis point, y-axis point) or a size (width/length, height). And, a vector 3018 keyframe may be a keyframe that animates a property that has more than two values like, for example, colors that manipulate the different values of their constituent color components (e.g., red, green, blue, alpha).

In some embodiments, filters 3019 operate as visual elements that are applied to a layer, effect container, effect, or slide. A filter 3019 may be, for example, a shadow, blurred image, or some other compatible visual element capable of being applied to a layer, effect container, effect, or slide (e.g., steps 6002, 7002).

In some embodiments, a playlist 3008 associated with a document 1001 may contain a list of songs (e.g., steps 6002, 7002). The playlist 3008 may organize songs such that they are played in a specific order, determined manually by a user of the exemplary application 1000, or automatically through the exemplary application 1000. An automatic playlist may be created according to song genre, file characteristics (e.g., type, size, date, etc.), or according to the feature for dynamically profiling a slideshow soundtrack based on various criteria like beats per minute (BPM), rhythmic strength (RS), harmonic complexity (HC), and/or root mean square density (RMS or RMS strength). The songs (e.g., a reference to a playlist) may be stored in digital format in local storage 4006 or on an auxiliary device/component 4005 that communicates with the system 4000 through a communications protocol or standard. The songs may be stored in a single file (or, other logical/physical data aggregator) or many files. In addition to songs, a playlist 3008 may contain other compatible media content like videos with audio content (which, for example, may be parsed from the video file into an individual song/audio file, or playlist). To associate a playlist, song/audio file, or any compatible media content with a document 1001, the user may select it/them from the select media content 1008 menu and drag the respective playlist, song/audio file, or other compatible media content, via the exemplary application 1000, into the effect containers region 1003 (see, for example, the reference to "Drag Audio Here" in the exemplary application 1000) (e.g., steps 6002, 7002). Songs may be played in the background while a document is being displayed/played, or they may, alternatively, be associated with foreground layers or effects that may be organized on top of another, thus, enabling the songs to be switched in coordination with the various switching (e.g., via gaps or transitions) from one layer or effect to another (e.g., steps 6004, 7004). Further, songs may, according to a default setting, start and stop playing based on the start and stop times that may be given from a media player or media management application. The user of the exemplary application 1000 may, however, define a custom start or stop time via a song (or, playlist) menu option of the application 1000.

Figure 2:
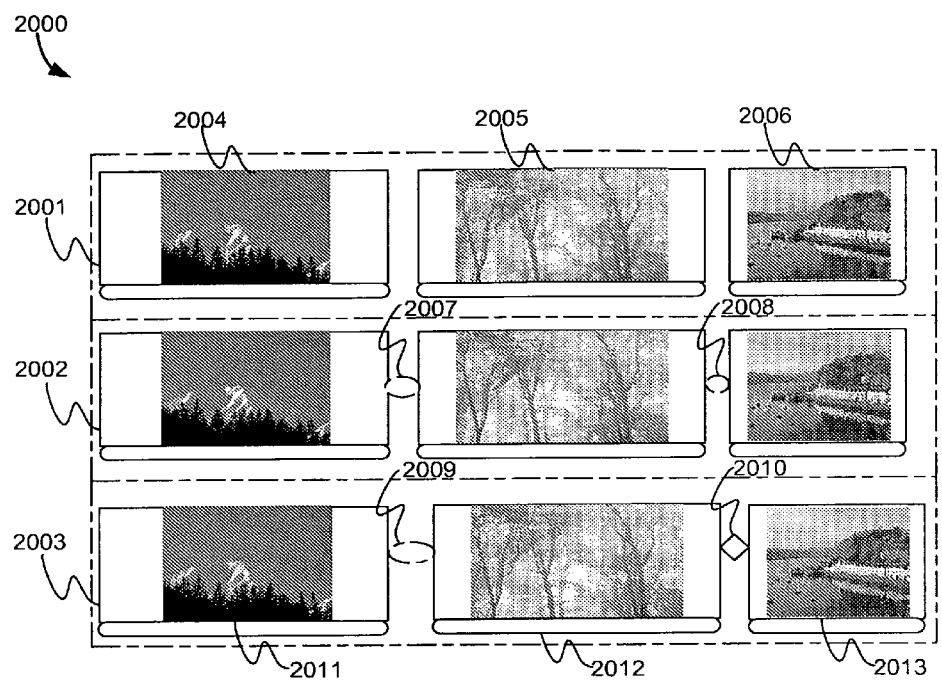
FIG. 2 illustrates features of an exemplary embodiment in accordance with the present invention.

FIG. 2 illustrates features of an exemplary embodiment in accordance with the present invention. As illustrated, the exemplary embodiment of an add effects container region 2000 (similar to that of 1003; FIG. 1) contains three layers, the first is a background layer 2001, and the second and third are foreground layers 2002 and 2003 (e.g., steps 6001, 7001, 6002, 7002, 7008, 7009). Effect containers are illustrated as 2004, 2005, and 2006 in the background layer 2001. The foreground layers 2002 and 2003 also contain effect containers. Each effect container has effects with slides/media content within, such as illustrated by the slides (e.g., images) 2011 and 2013 in the second foreground layer 2003. Moreover, gaps 2007, 2008, 2009 separate effect containers in foreground layers 2002 and 2003. Also, transition 2010 separates (or, "link") effect containers in the foreground layer 2003. Further, an effects style 2012 is illustrated for the second effect container of the second foreground layer 2003 (e.g., step 7007). The effects style may display one or more styles or properties such as, for example, a media presentation order, a thumbnail, a layout, a position, a size, a zPosition (e.g., the position in a three-dimensional (x, y, z) orientation), a base period, an effect presets, an effect settings overwrite, a matching layer duration, a recommended effect duration, a transition preset, a transition settings overwrite, a recommended transition duration, a filter preset, a filter preset criteria, a filter likelihood, a gap likelihood, a layer importance, a slide filter preset criteria, a slide frames criteria, an automatic filter likelihood, and a support per-slide customization (e.g., step 7014). Other styles or properties may also be displayed at 2012 or in another section of the graphical user interface of the exemplary application 1000 or at the container region 2000 like, for example, a background color and an automatic filter mode (e.g., step 7015). The styles or properties may apply to the effects, effect containers, layers, and/or document, and may further be customized for each of the foregoing or inherited from each other, whether set by default or is customized (e.g., step 7007).

Figure 2A:
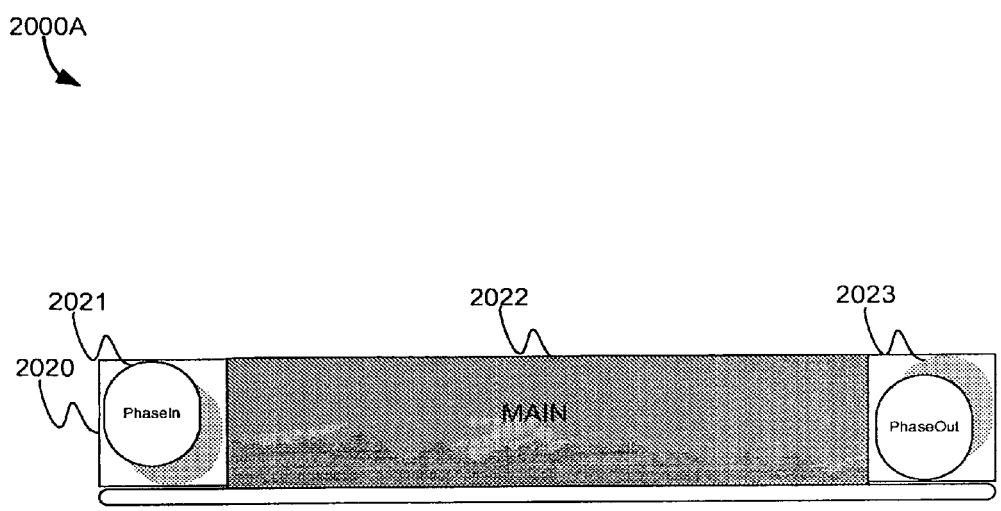
FIG. 2A illustrates features of an exemplary embodiment in accordance with the present invention.

FIG. 2A illustrates features of an exemplary embodiment in accordance with the present invention. The exemplary embodiment 2000A illustrates an effect container 2020 with a phaseIn effect 2021, a main effect 2022, and a phaseOut effect 2023. Also, the blurred image (or, movie or other media content) shown behind the "main" text illustrates an exemplary instance of a blurred effect during the main effect 2022 phase of the effect container 2020. The phaseIn effect 2021 (e.g., like a fade-in) may be used, for example, to build a single/multi-slide layout, where as the phaseOut effect 2023 (e.g., like a fade-out) may be used, for example, to tear down/away or remove a single/multi-slide layout. Thus, the phaseIn 2021, main 2022, and phaseOut 2023 effects may be applied to a single slide or to multiple slides. Furthermore, there may be a time associated with each phaseIn effect 2021, main effect 20222, and phaseOut effect 2023. The time spent on each slide of a multi-slide effect may be equally divided among the individual slides (e.g., total effect time divided by the total number of slide, and adjusted accordingly) or apportioned in a custom manner to each individual slide.

Figure 3:
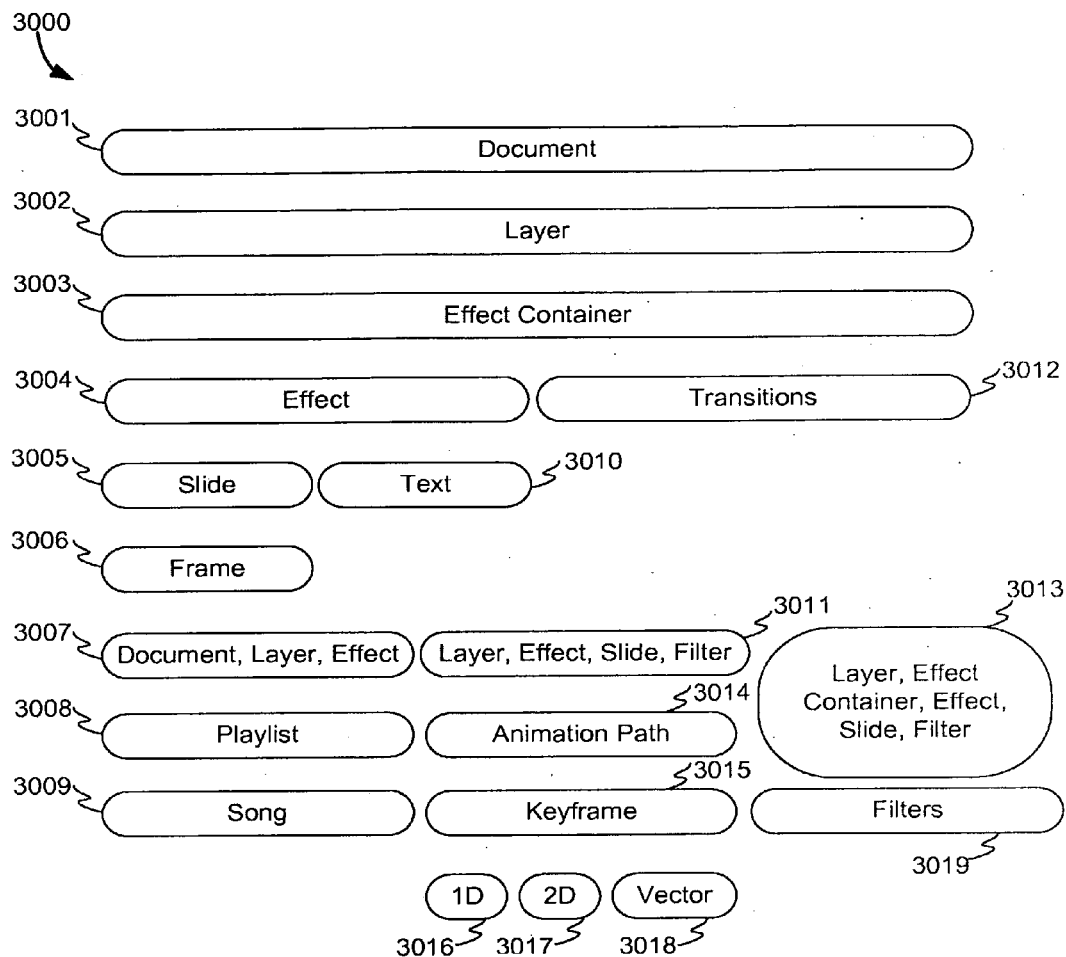
FIG. 3 is a block diagram illustrating framework features of an exemplary embodiment in accordance with the present invention.

FIG. 3 is a block diagram illustrating framework features of an exemplary embodiment in accordance with the present invention. In some embodiments, the exemplary application 1000 executing on the exemplary system 4000 may cause the CPU 4001 to execute instructions for creating an electronic structure (e.g., 3000) for storage in memory 4002, local storage 4006, or on an auxiliary device/component 4005, such instructions may comprise: creating a document (e.g., 3001); associating one or more layers (e.g., 3002) to the document, wherein the layers (e.g., 3002) are organized within the document (e.g., 3002); associating one or more effect containers (e.g., 3003) with the layers, wherein the effect containers (e.g., 3003) are linked and are organized within the layers (e.g., 3003); associating one or more effects (e.g., 3004) with the effect containers (e.g., 3004); and assembling the effects (e.g., 3004), effect containers (e.g., 3003), and layers (e.g., 3002) logically within the document. The application features 3000-3019 are referred to and described in detail herein, and in view of the exemplary application 1000, which may be executed, for example, on the exemplary system 4000.

Figure 3A:
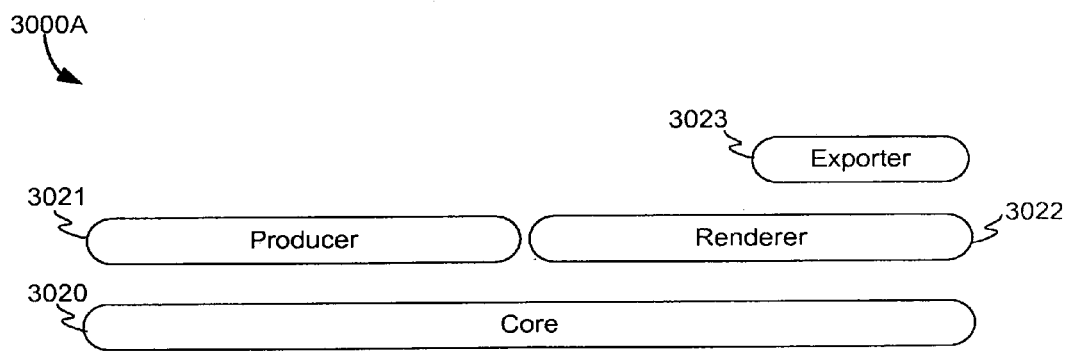
FIG. 3A is a block diagram illustrating framework features of an exemplary embodiment in accordance with the present invention.

FIG. 3A is a block diagram illustrating framework features of an exemplary embodiment in accordance with the present invention. The framework features 3000A may comprise framework module units (or, modules) such as, for example, a core 3020, a producer 3021, a renderer 3022, and an exporter 3023. The features 3000A may implement the structure/architecture of the exemplary application 1000, and may be executed, for example, using a system like that illustrated in FIGS. 4-5.

In some embodiments, the core 3020 module may be considered the low-level data structure module and it may, for example, perform routines for representing how a slideshow/media presentation document is constructed, and contain the necessary information for accurately representing a slideshow/media presentation document according to features, many of which are described herein (e.g., steps 6001-6003, 7001-7003). Some of those features may include, for example, features related to timing (e.g., gaps 1013, transitions 1014), positioning (e.g., background layer 1004, foreground layer 1005, effects of effect containers 2004-2006, slides 2011, filters 3019, text 3010), sizing (e.g., keyframe 3015, animation path 3014, as well as their interaction), and files (e.g., songs 3008, playlists 3009).

In some embodiments, the producer 3021 may be considered the module for creating how a slideshow will look and feel (e.g., steps 6002-6003, 7002-7003), performing several analyses related to media content (e.g., images, audio, video of layers, effect containers, effects, and slides) (e.g., step 7016), and automatically assembling slideshows/media presentations according to data that may result from the analyses (e.g., steps 6004, 7004, 7011). The several analyses (e.g., step 7016) may include analysis of characteristics related to layers, effect containers, effects, and slides. Such characteristics may include, for example, layer type (e.g., background 1004, foreground 1005), layer number (e.g., position in relation to the background-most layer 1004), number of effect containers, length of gaps 1013 and transitions 1014, type of transitions 1014, type of effects, number of effects, number of slides, type of slides, document length 1004, user preferences (e.g., for ordering layers, effect containers, effects, slides), audio analyses, video analyses, or other similar characteristics. After performing the several analyses using, for example, the producer 3021, the resulting data from the several analyses may be processed by the producer 3021, the core 3020, the renderer 3022, the exporter 3023, or other module (e.g., step 7017). The producer 3021 may, for example, interface with and utilize the application programming interfaces (API) of frameworks like, for example, browsers or QuickTime® to gather such information as thumbnail data and resolutions for images, as well as audio or video durations or other characteristics. The gathered information may then be processed by the producer 3021 in accordance with one or more general/specific algorithms (or, other analytical methods) and then used by the producer 3021 (or, other module with which the producer 3021 may call), for example, to automatically assemble a slideshow or media presentation document (e.g., 7011). The producer 3021 may further, for example, assemble a document via core 3020 for play/display using the features of renderer 3022, by accessing photos and coupling such photos with a style (e.g., 1015) (see description of FIGS. 8-12). In addition, the producer 3021 may also, for example, perform audio analysis functions on songs 3009 or a set of songs (playlist 3008) using such analysis like, for example, beat detection/mapping. The producer 3021 may also keep track of available styles (e.g., 1015), effects 3004, transitions 3012, and frames 3006.

In some embodiments, the renderer 3022 may be considered the play/display module. The renderer 3022 may receive slideshow/media presentation data from, for example, the core 3020 and producer 3021 and may render such data such that it may be sent to a graphics card or other display device (or interface) (e.g., 4003). The renderer 3022 may interface with QuickTime® media player (e.g., the framework of QuickTime® media player) or another compatible application (or, framework) for audio/video decoding. In addition, the renderer 3022 may also interface with a composer-type application for actual rendering (e.g., of the slides), and the same or another similar application for applying filters 3006.

In some embodiments, the exporter 3023 may be considered the sharing module. The exporter 3023 may, for example, use renderer 3022 to export the slideshow/media presentation document to different formats (e.g., file formats) like those supported by QuickTime® or other similar applications. The exporter 3023 may, for example, obtain movie frame-type data from renderer 3022 and add it to a movie-type file. When the exporter 3023 is finished retrieving data for each movie, the slideshow/media presentation document would be available for access and sharing through the exemplary application 1000 or other applications that may access or handle the document in its final format.

Figure 4:
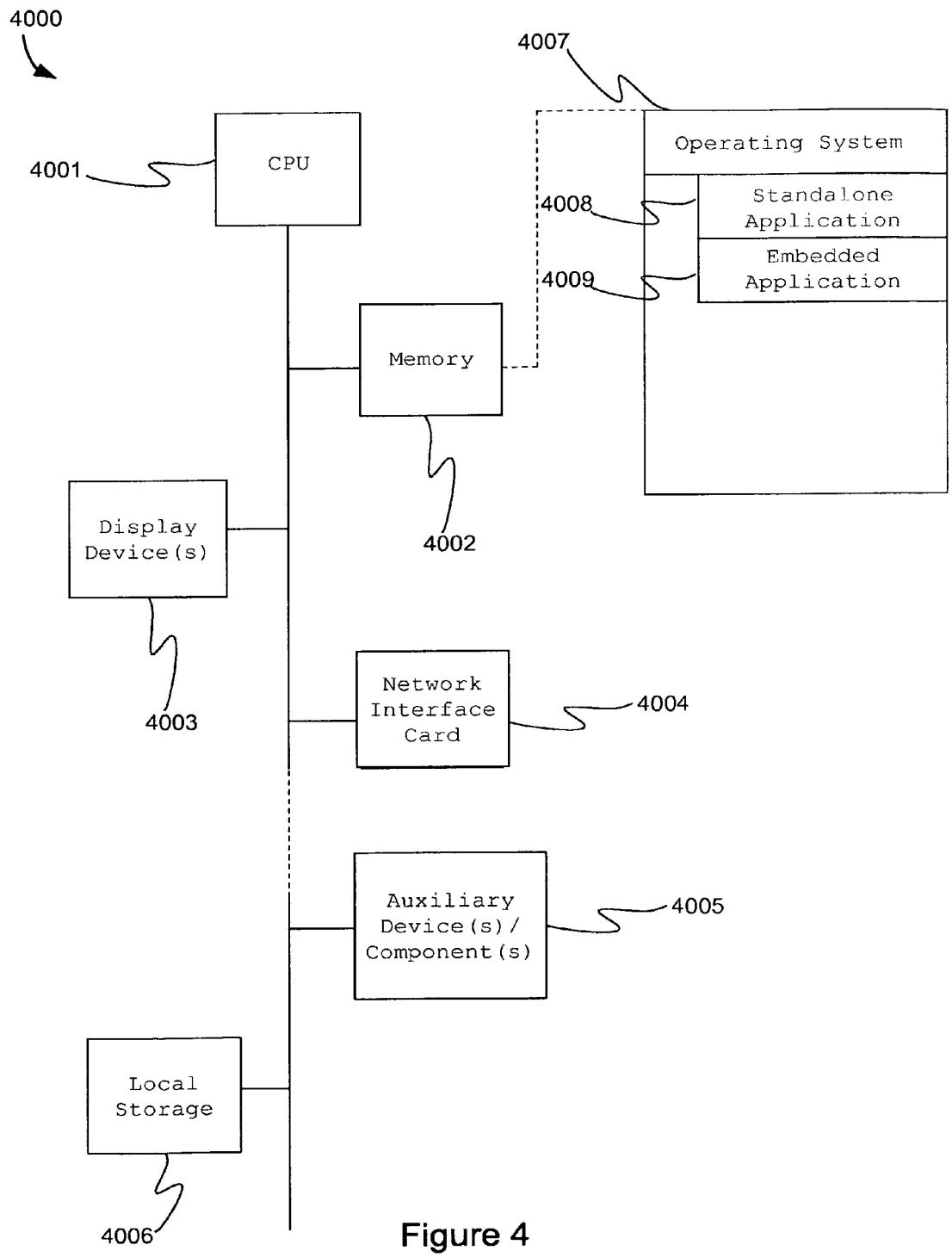
FIG. 4 illustrates an exemplary system implementing an application in accordance with the present invention.

FIG. 4 illustrates an exemplary system implementing an application in accordance with the present invention. The exemplary system 4000, described above, may implement the exemplary application 1000. Other modules and other routine programming-related matters may not be shown in FIG. 4, but would be understood and may be implemented by one of ordinary skill in the art without departing from the scope of the present invention.

Figure 5:
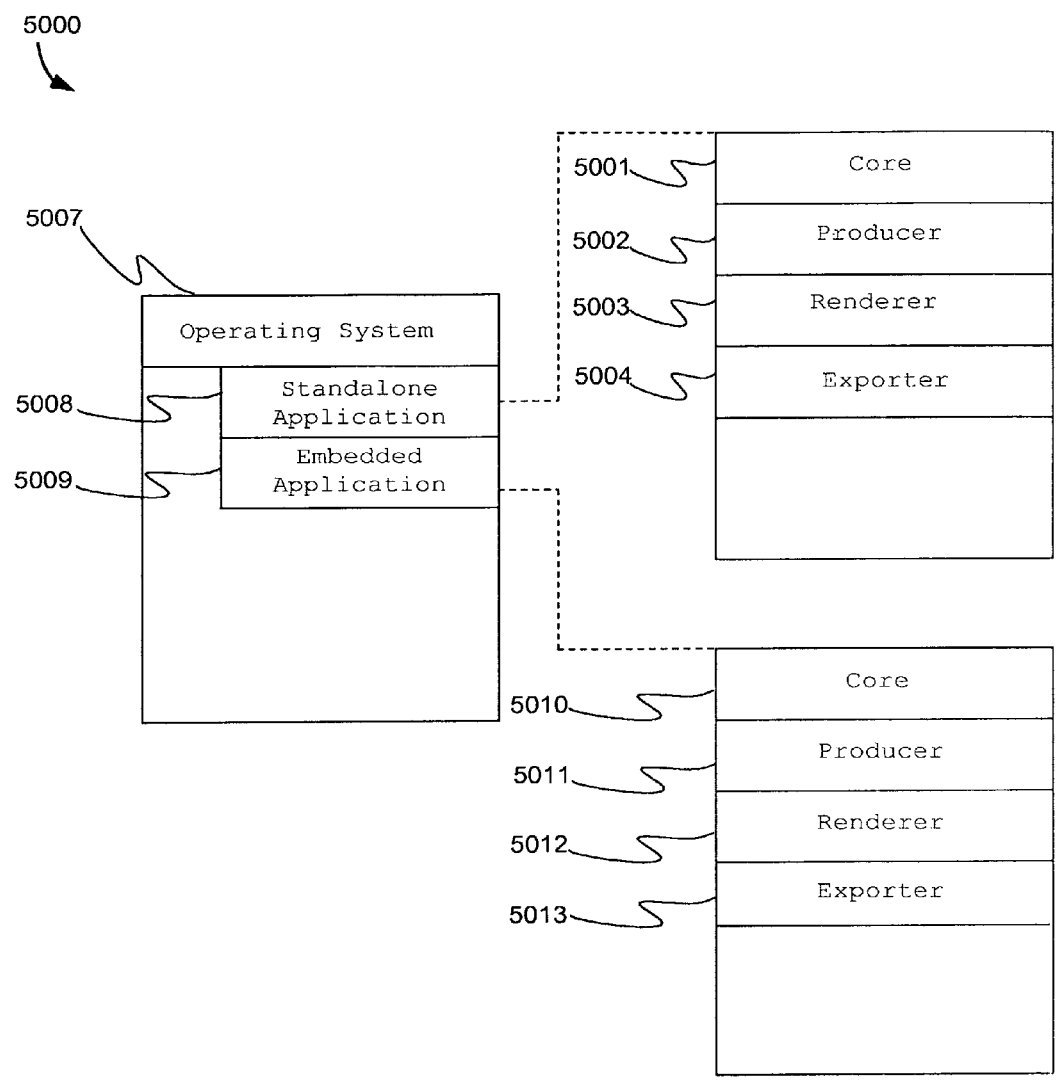
FIG. 5 illustrates an exemplary implementation of an application in accordance with the present invention.

FIG. 5 illustrates an exemplary implementation of an application in accordance with the present invention. The module units 5001-5004 and 5010-5013 of the exemplary implementation of an application 5000 are described more fully above for FIG. 3A. The module units 5001-5004 and 5010-5013 may be implemented, for example, by a standalone 4008, 5008 or an embedded 4009, 5009 application, respectively. Further, an exemplary system such as that illustrated in FIG. 4 may execute the standalone 4008, 5008 or embedded 4009, 5009 applications. Other compatible or similar systems may also execute the applications 4008, 5008 and 4009, 5009 without departing from the scope of the present invention.

Figure 6:
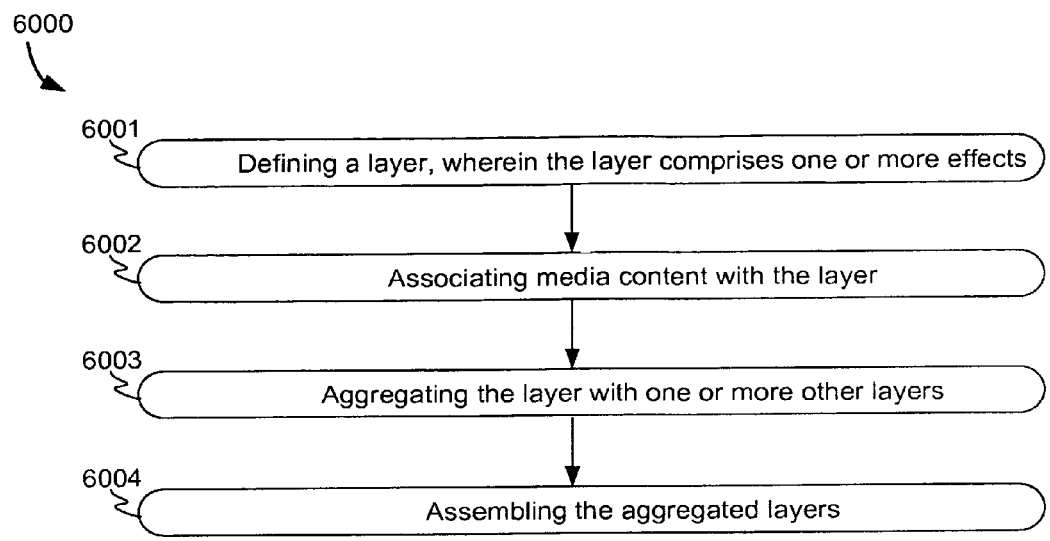
FIG. 6 illustrates an exemplary method in accordance with the present invention.

FIG. 6 illustrates an exemplary method in accordance with the present invention. The exemplary method 6000 comprises the following computer-implemented steps: defining a layer, wherein the layer comprises one or more effects 6001; associating media content with the layer 6002; aggregating the layer with one or more other layers 6003; and assembling the aggregated layer 6004. The exemplary method 6000 and, further, steps 6001-6004 may be implemented using an exemplary system such as that embodied in FIG. 4, which may execute the exemplary application 1000, and as described herein.

Figure 7:
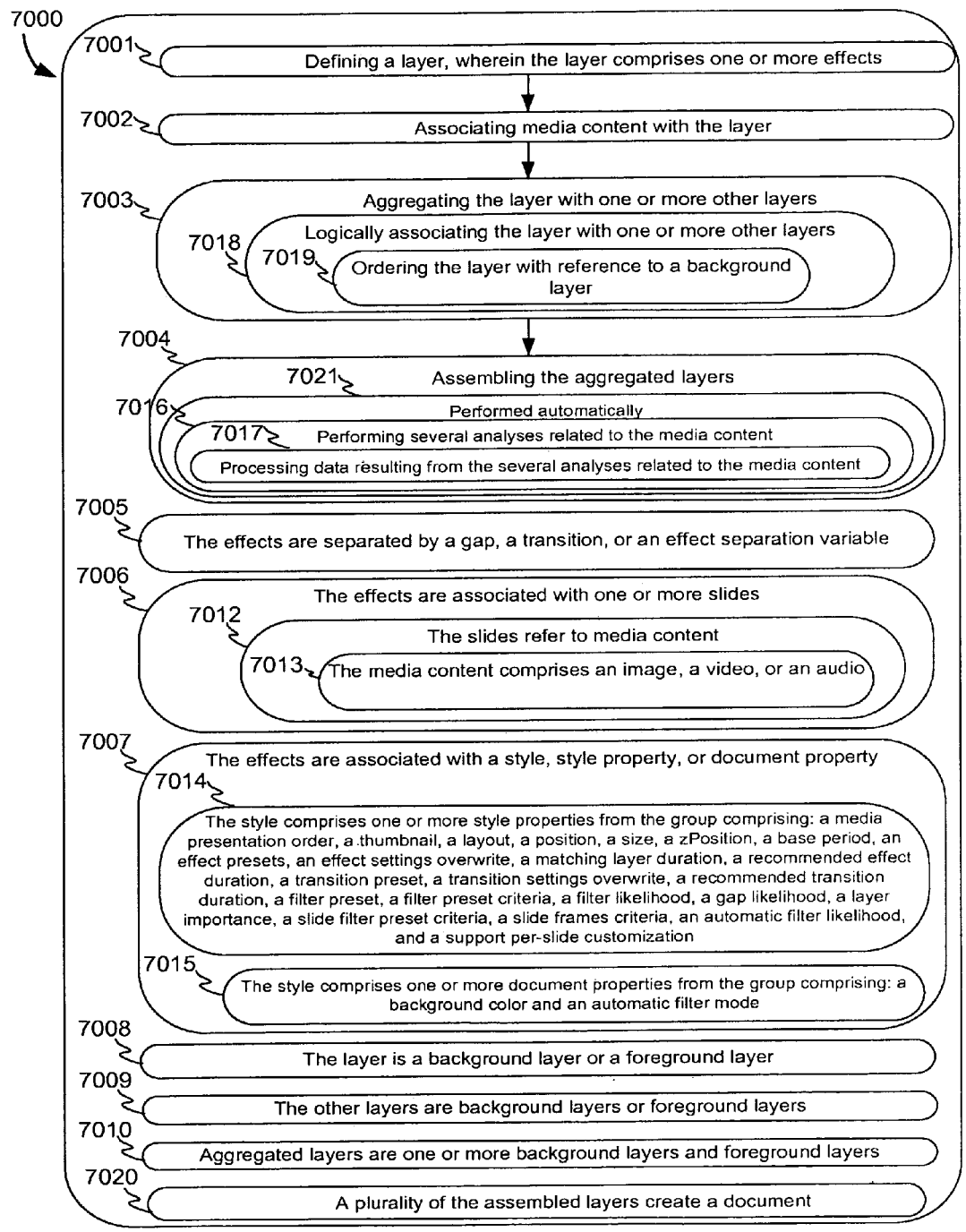
FIG. 7 illustrates an exemplary method in accordance with the present invention.

FIG. 7 illustrates an exemplary method in accordance with the present invention. The exemplary method 7000 comprises the computer-implemented steps of the exemplary method 6000 with the addition of steps 7005-7015. The exemplary method 7000 and, further, steps 7001-7015 may be implemented using an exemplary system such as that embodied in FIG. 4, which may execute the exemplary application 1000, and as described herein.

Figure 8:
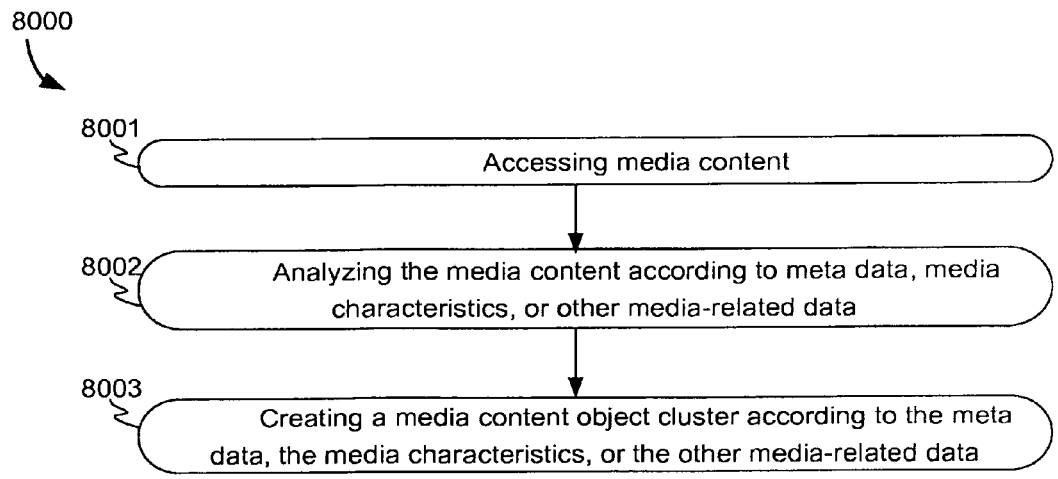
FIG. 8 illustrates an exemplary method in accordance with the present invention.

FIG. 8 illustrates an exemplary method in accordance with the present invention. The exemplary method 8000 comprises the following computer-implemented steps: accessing media content; analyzing the media content according to meta data, media characteristics, or other media-related data; and, creating a media content object cluster according to the meta data, the media characteristics, or the other media-related data. The exemplary method 8000 and, further, steps 8001-8003 may be implemented using an exemplary system such as that embodied in FIG. 4, which may execute the exemplary application 1000, and as described herein.

Figure 9:
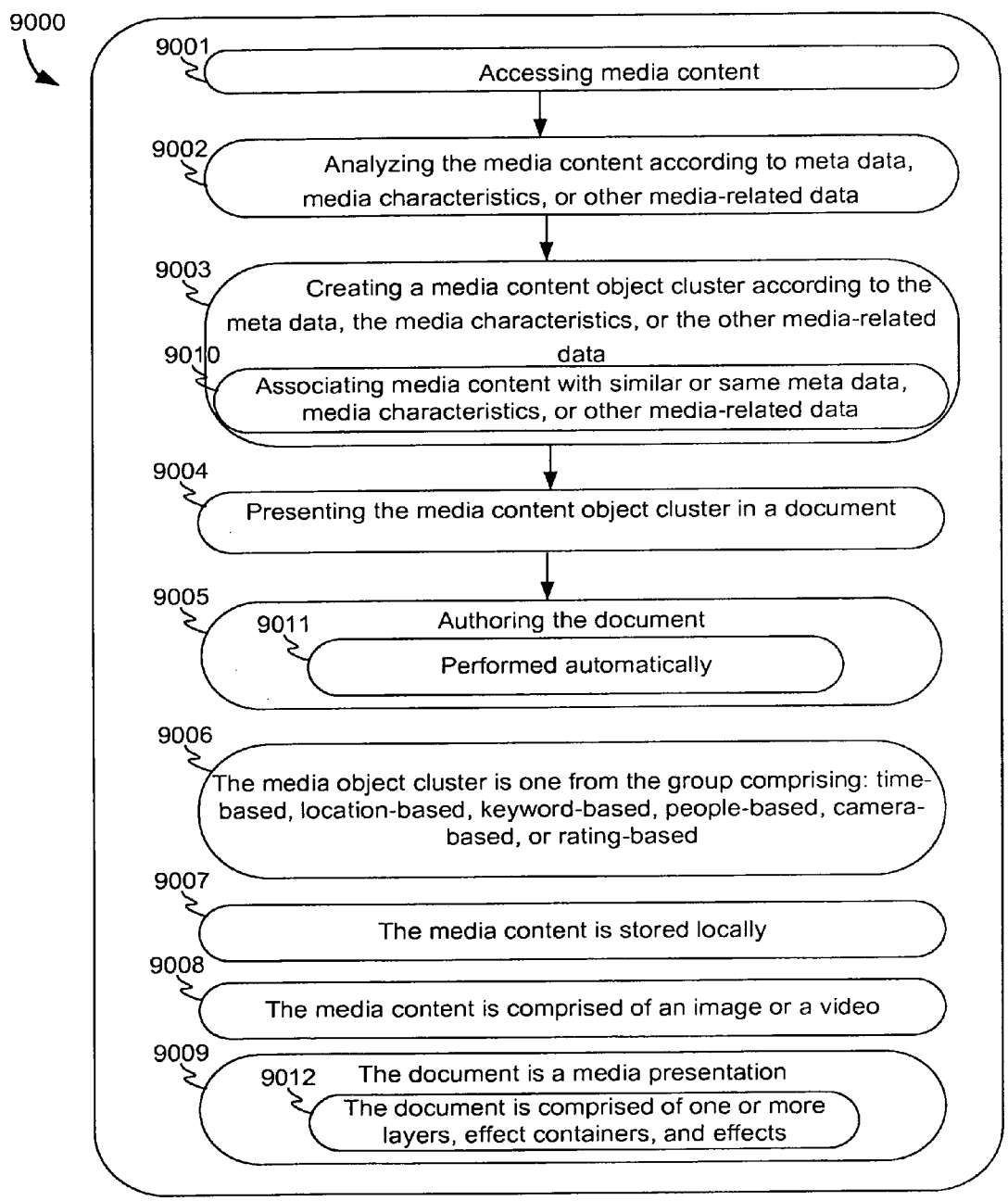
FIG. 9 illustrates an exemplary method in accordance with the present invention.

FIG. 9 illustrates an exemplary method in accordance with the present invention. The exemplary method 9000 comprises the computer-implemented steps of the exemplary method 8000 with the addition of steps 9004-9012. The exemplary method 9000 and, further, steps 9001-9012 may be implemented using an exemplary system such as that embodied in FIG. 4, which may execute the exemplary application 1000, and as described herein.

Figure 10:
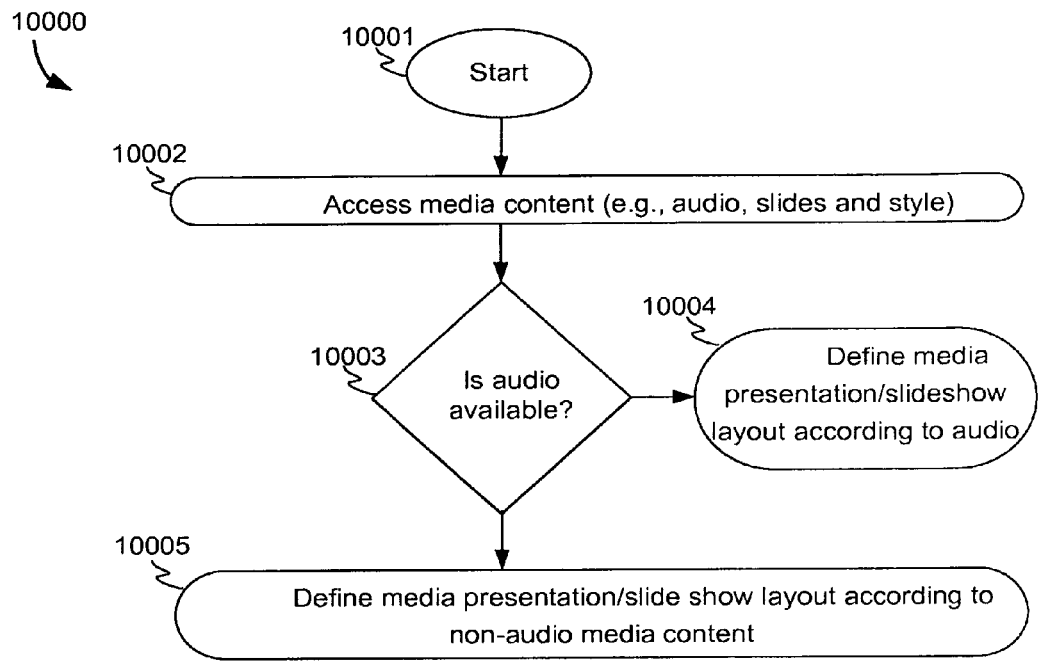
FIG. 10 illustrates an exemplary media effects authoring flowchart in accordance with the present invention.

FIG. 10 illustrates an exemplary media effects authoring flowchart in accordance with the present invention. The flowchart 10000 comprises a series of steps and logic 10001-10005 that may be executed by, for example, a framework module unit such as the producer 3021 (or, alternatively or in addition, the renderer 3022) when implementing one or more steps 8001-8003, 9001-9012 for authoring media effects and, more specifically, for example, media content object clusters. The flowchart recites a start 10001 position for the producer 3021 or other framework module, then a step where the module accesses media content (e.g., step 9008) that may be stored locally 4006 (e.g., step 9007), remotely (e.g., over a network accessible via a network interface card 4004; RSS feed, shared/accessible media gallery etc.), or on an auxiliary device/component 4005 (e.g., step 8001, 9001). Next, the module may check whether audio is available 10003 and proceed according to two different logic steps 10004, 10005. If audio is available as part of the accessed media content, then the module may proceed to the logical step, and subsequent steps, for defining a media presentation/slideshow layout (e.g., coordination, ordering, or grouping of slides—i.e., images, video, text, or other media) according to audio 10004. If audio is not available as part of the accessed media content, then the module may proceed to the logical step, and subsequent steps, for defining a media presentation/slideshow according to non-audio media content 10005. If step 10004 is executed, then the module may define the presentation/slideshow layout according to the audio analyses performed on songs 3009 or a set of songs (playlist 3008), where such analyses may include, for example, beat detection/mapping. If step 10005 is executed, however, then the module may define the media presentation/slideshow layout of effects according to analyses of meta data, media characteristics, or other media-related data (e.g., steps 8002, 9002).

In some embodiments, in steps 8002, 9002, the producer 3021 or other framework module may analyze the media content through meta data by accessing file characteristics, encoded data, tags/XML data, or by accessing media characteristics (e.g., camera/capture device make/model) or other media-related data. For example, meta data may be one or more of a time associated with the media content's creation, a rating associated with the media content (individually or in the aggregate), keywords associated with the media content, comments associated with the media content, a country/state/province/city associated with the media content, a longitude/latitude associated with the media content, or some other readable or extrapolated data.

Figure 10A:
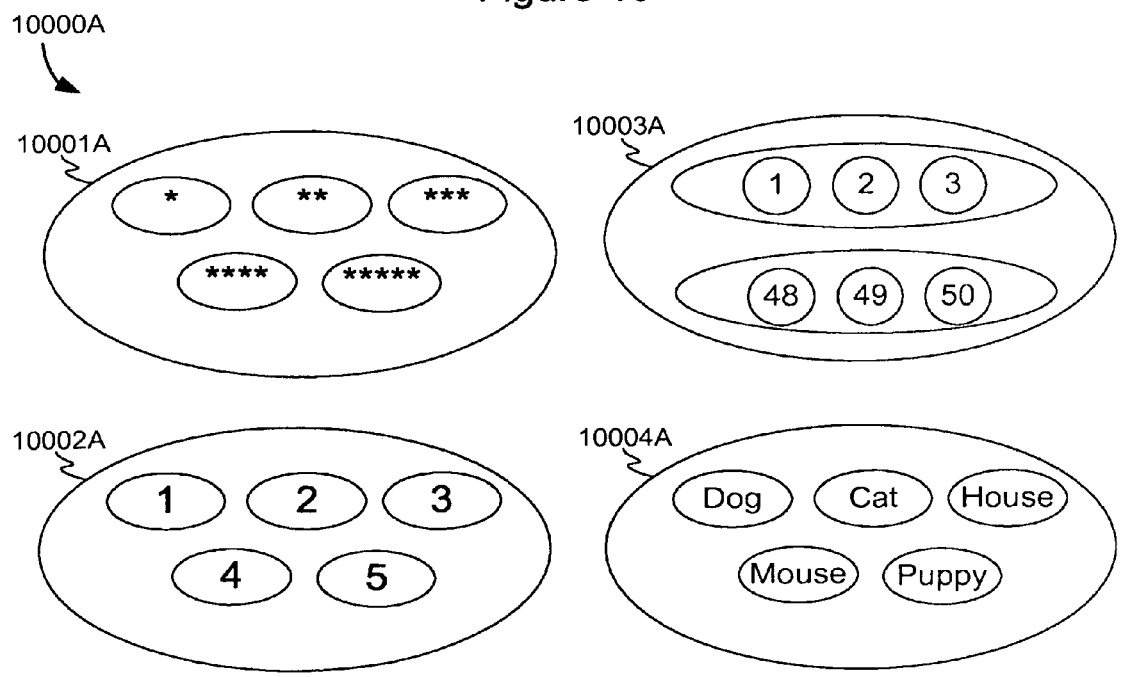
FIG. 10A illustrates exemplary media effects object clusters in accordance with the present invention.

In some embodiments, the producer 3021 or other framework module may further analyze the gathered meta data (like that described above) by comparing and contrasting the similarities and difference that may be prevalent among the meta data, while tracking which meta data is associated with which media content. For example, the analysis may involve comparing and contrasting the date/time associated with the media content, textual similarities associated with the media content, the places where media content originated or was generated, a rating associated with the media content, or an order (e.g., chronology) associated with the media content. According to the results of such analyses, the producer 3021 or other framework module may create media content object clusters (e.g., steps 8003, 9003; 10000A) or, more specifically, for example, slide clusters (e.g., 10000A), where the results indicate that one or more media content types may be related (e.g., 10001A-10004A). Slide clusters may be considered a collection of slides that may be logically grouped according to predefined criteria, where the criteria may vary and be defined according to media presentation/slideshow styles or properties. For example, media content object clusters may be created for media content types where the clusters are time/order-based (e.g., FIG. 10A, reference numeral 10002A), location-based, keyword-based (e.g., FIG. 10A, reference numeral 10004A), people-based, camera-based, rating based (e.g., FIG. 10A, reference numeral 10001A), or according to some other readable or extractable logical grouping (e.g., steps 9006, 9010; FIG. 10A, reference numeral 10003A) (see description for FIG. 10A). Moreover, based on the analyses, a link strength (e.g., having a value from one (1) to ten (10)) may be associated with a cluster in order to indicate how likely the cluster may be useful to the user, based on how related the media content associated with such a cluster may be. For example, a slide cluster with a link strength value of seven (7) indicates that the media content associated with the cluster is more likely to be closely related than that of a slide cluster with a link strength of two (2). If the media content has no meta data, media characteristics, or other media-related data that the producer 3021 or other framework module may analyze, then a slide cluster with a link strength of one (1) may be created and the media content may be sorted chronologically, if possible, or, alternatively, in a random order.

In some embodiments, slide clusters where media content is sorted chronologically may be used for a media presentation/slideshow document (e.g., step 9004) where, for example, the purpose is to tell a story. Further, slide clusters where media content is sorted according to a keyword, burst rate, rating, or date/time, etc. may be used for a media presentation where, for example, the purpose is to illustrate a portfolio of media content (e.g., a set of sequential time-based images of a wind surfer such as that illustrated in FIG. 11, reference numerals 11001-11006; or, alternatively, a collection of images of flowers, or a specific location such as that illustrated in FIG. 12, reference numerals 12002, 12003).

FIG. 10A illustrates exemplary media effects object clusters in accordance with the present invention. The exemplary clusters 10000A illustrated are grouped according to a time/order 10002A, a keyword 10004A, a rating 10001A, or some other readable or extractable logical grouping based on content 10003A. Each of the clusters 10001A-10004A may further have a link strength associated with each of them.

Figure 11:
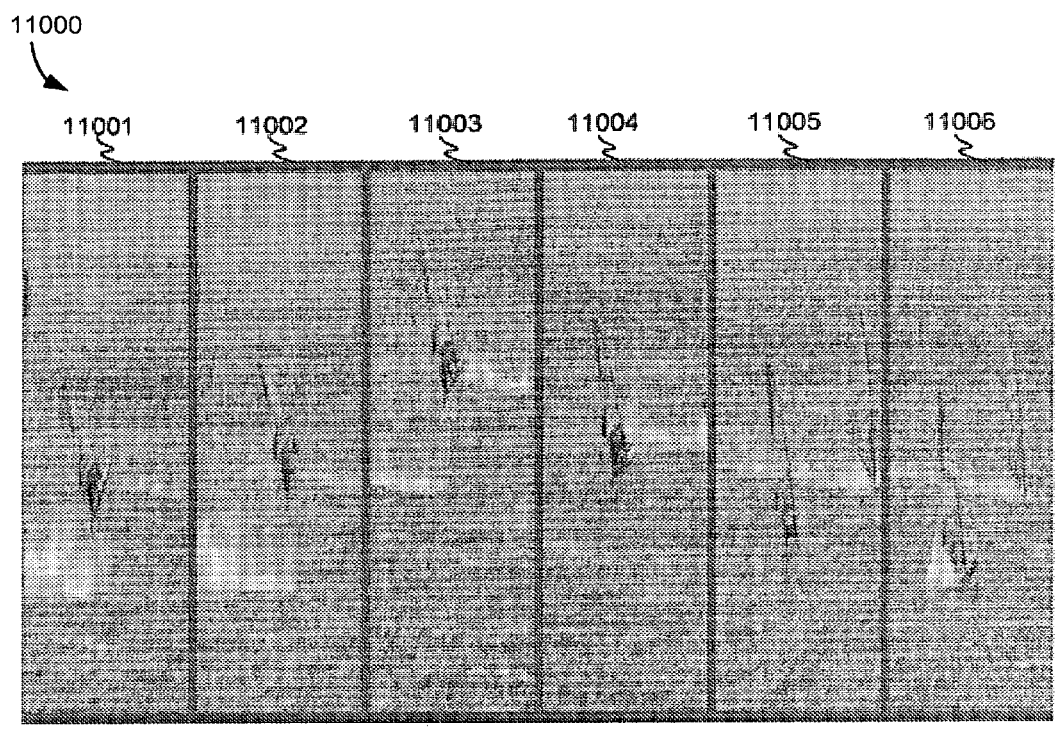
FIG. 11 illustrates an exemplary media effects time-based objects cluster in accordance with the present invention.

FIG. 11 illustrates an exemplary media effects time-based objects cluster in accordance with the present invention. The media content comprising the media objects 11001-11006, which appear to have a sequence, are a series of images that may have been taken during a time interval. The exemplary media effects time-based objects cluster 11000 may be the result of the producer 3021 or other framework module analyzing meta data, media characteristics, or other media-related data of the images, then determining their grouping in a time-based cluster. Moreover, the producer 3021 or other framework module may have also determined a link strength value and associated it with the cluster. With the cluster available, the producer 3021, renderer 3022 or other framework module may combine the cluster with visual expressions in a document for presentation (e.g., steps 9005, 9011). Presentation may, for example, simply be the illustration of the cluster images at the same time (e.g., in a 3×2 layout), in animated form, in a flip-book-type animation, or some other presentation effect, style or format. The producer 3021, renderer 3022 or other framework module may automatically choose the appropriate presentation effect, style or format based on the cluster type (e.g., time-based, rating-based, keyword-based, etc.). For example, the flip-book effect may be chosen automatically because the cluster is time-based and may lend itself to such presentation (e.g., step 9011).

Figure 12:
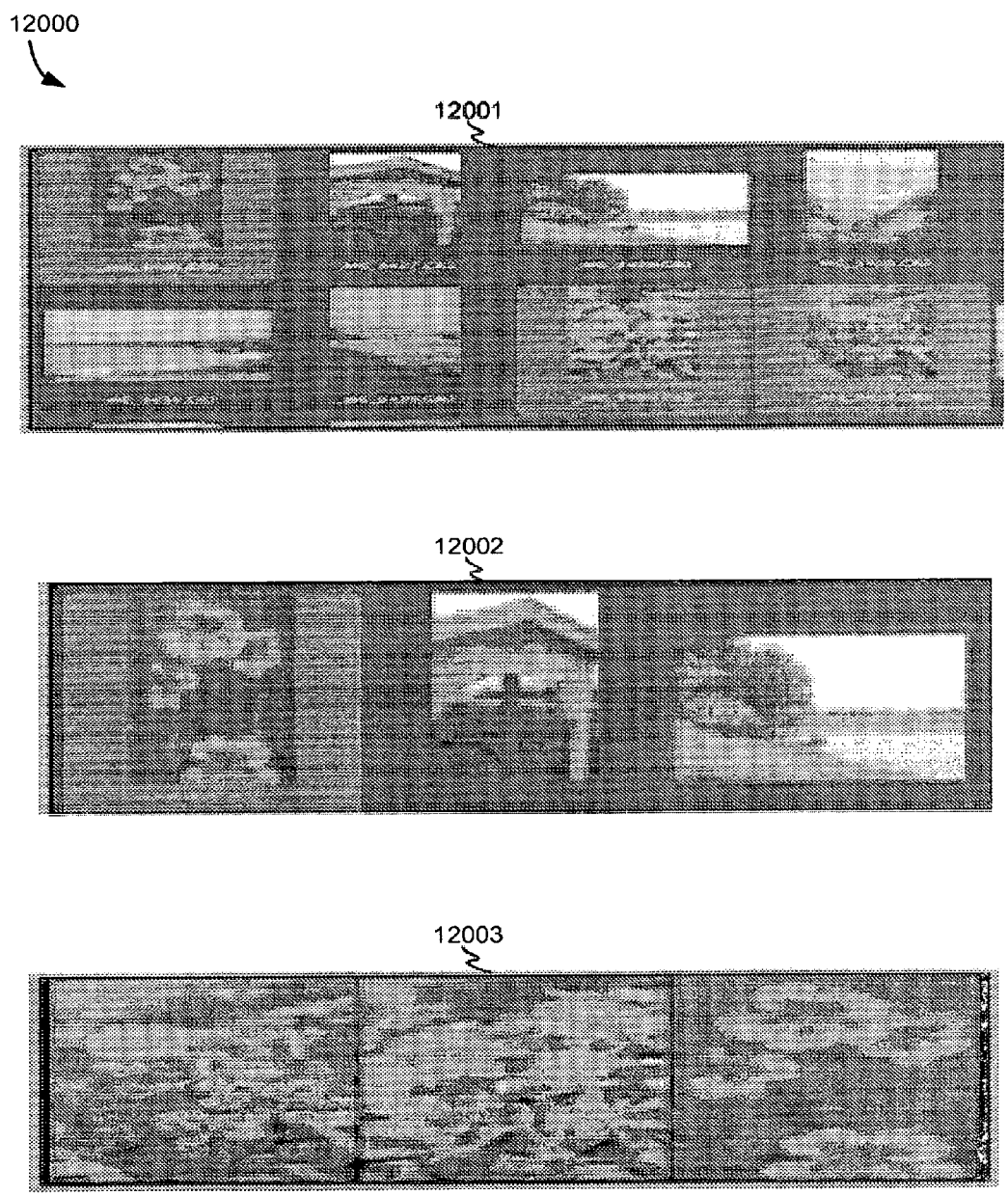
FIG. 12 illustrates an exemplary media effects keyword-based objects cluster in accordance with the present invention.

FIG. 12 illustrates an exemplary media effects keyword-based objects cluster in accordance with the present invention. The media content comprising the media objects 12001, some of which appear to be related, are a series of images that may have been taken at the same or different time and may have common meta data. The exemplary media effects keyword-based objects cluster 12003 may be the result of the producer 3021 or other framework module analyzing meta data, media characteristics, or other media-related data of the images 12001, then determining their grouping in a keyword-based cluster. Moreover, the producer 3021 or other framework module may have also determined a link strength value and associated it with the cluster. With the cluster available, the producer 3021, renderer 3022 or other framework module may combine the cluster with visual expressions in a document for presentation (e.g., steps 9005, 9011). As is illustrated in FIG. 12, object clustering may result in a keyword-based cluster 12003 named "flower," which may appear to make more sense to a human observer than a non-object cluster grouping 12002. The grouping of images, all of which contain a flower, together in a cluster 12003 may make more sense to a human observer of a media presentation/slideshow document than the grouping 12002 of a flower along with coastal images. In this case, the clustered media content (e.g., images) had the keyword "flower" associated with each of them and, thus, the producer 3021 or other framework module may be able to cluster the media content in a keyword-based cluster 12003 that may make sense to a human observer. Alternatively, the media content may be clustered based on time, rating, or any other cluster-type that may be created using meta data, media characteristics, or other media-related data.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

The invention claimed is:

1. A method for authoring media effects, the method comprising:
   at a computing device:
   accessing media content stored in at least one memory that is communicatively coupled with the computing device;
   grouping the media content according to media-related data to establish media content clusters, wherein the media-related data includes time, location, people, and rating;
   isolating media content clusters having a link strength that satisfies a threshold to produce isolated media content clusters, wherein the link strength for a media content cluster indicates a relevance of the media content cluster to the media-related data used to establish the media content cluster;
   determining, for the media content for each isolated media content cluster, a respective transition effect based on the media-related data of the isolated media content cluster;
   assembling the isolated media content clusters to create a document; and
   presenting the document within a graphical user interface (GUI) on a display device with which the computing device is communicatively coupled, wherein the respective transition effect is employed for each isolated media content cluster as the media content of the isolated media content cluster is navigated.

2. The method of claim 1, wherein a different transition effect is employed when transitioning between isolated media content clusters as the document is navigated.

3. The method of claim 1, wherein document comprises a slideshow.

4. The method of claim 3, wherein the media content clusters are grouped by time-based media-related data, and the slideshow presents the media content in chronological order.

5. The method of claim 3, wherein a rating is used to measure the link strength for selecting the media content clusters, and the slideshow presents the media content having a predetermined threshold rating.

6. The method of claim 3, wherein the media content clusters are grouped by people-based media-related data, and the slideshow presents the media content having one or more particular people identified therein.

7. The method of claim 1, wherein the media content clusters are grouped by media-related data selected from among a group consisting of: location-based, keyword-based, and camera-based.

8. A computing device configured to author media effects, the computing device comprising:
   at least one processor; and
   at least one memory storing instructions that, when executed by the at least one processor, cause the computing device to:
   access media content stored in the at least one memory;
   grouping the media content according to media-related data to establish media content clusters, wherein the media-related data includes time, location, people, and rating;
   isolating media content clusters having a link strength that satisfies a threshold to produce isolated media content clusters, wherein the link strength for a media content cluster indicates a relevance of the media content cluster to the media-related data used to establish the media content cluster;
   determining, for the media content for each isolated media content cluster, a respective transition effect based on the media-related data of the isolated media content cluster;
   assembling the isolated media content clusters to create a document; and
   presenting the document within a graphical user interface (GUI) on a display device with which the computing device is communicatively coupled, wherein the respective transition effect is employed for each isolated media content cluster as the media content of the isolated media content cluster is navigated.

9. The computing device of claim 8, wherein a different transition effect is employed when transitioning between isolated media content clusters as the document is navigated.

10. The computing device of claim 8, wherein document comprises a slideshow.

11. The computing device of claim 10, wherein the media content clusters are grouped by time-based media-related data, and the at least one processor further causes the computing device to:

present the media content in the slideshow in chronological order.

12. The computing device of claim 10, wherein a rating is used to measure the link strength for selecting the media content clusters, and the at least one processor further causes the computing device to:

present the media content having a predetermined threshold rating in the slideshow.

13. The computing device of claim 10, wherein the media content clusters are grouped by people-based media-related data, and the at least one processor further causes the computing device to:

present the media content having one or more particular people identified therein in the slideshow.

14. The computing device of claim 8, wherein the at least one processor further causes the computing device to group the media content clusters by media-related data selected from among a group consisting of:

location-based, keyword-based, and camera-based.

15. At least one non-transitory computer-readable medium storing instructions that, when executed by at least one processor of a computing device, cause the computing device to carry out steps that include:

accessing media content stored in at least one memory that is communicatively coupled with the computing device;

grouping the media content according to media-related data to establish media content clusters, wherein the media-related data includes time, location, people, and rating;

isolating media content clusters having a link strength that satisfies a threshold to produce isolated media content clusters, wherein the link strength for a media content cluster indicates a relevance of the media content cluster to the media-related data used to establish the media content cluster;

determining, for the media content for each isolated media content cluster, a respective transition effect based on the media-related data of the isolated media content cluster;

assembling the isolated media content clusters to create a document; and presenting the document within a graphical user interface (GUI) on a display device with which the computing device is communicatively coupled, wherein the respective transition effect is employed for each isolated media content cluster as the media content of the isolated media content cluster is navigated.

16. The at least one non-transitory computer-readable medium of claim 15, wherein a different transition effect is employed when transitioning between isolated media content clusters as the document is navigated.

17. The at least one non-transitory computer-readable medium of claim 15, wherein document comprises a slideshow.

18. The at least one non-transitory computer-readable medium of claim 17, wherein the media content clusters are grouped by time-based media-related data, and the slideshow presents the media content in chronological order.

19. The at least one non-transitory computer-readable medium of claim 17, wherein a rating is used to measure the link strength for selecting the media content clusters, and the slideshow presents the media content having a predetermined threshold rating.

20. The at least one non-transitory computer-readable medium of claim 17, wherein the media content clusters are grouped by people-based media-related data, and the slideshow presents the media content having one or more particular people identified therein.

\* \* \* \* \*